July 22, 1941.    W. A. REICHEL    2,249,914
SPEED CONTROL OF ROTOR GYROSCOPES
Filed Aug. 22, 1939    2 Sheets-Sheet 1
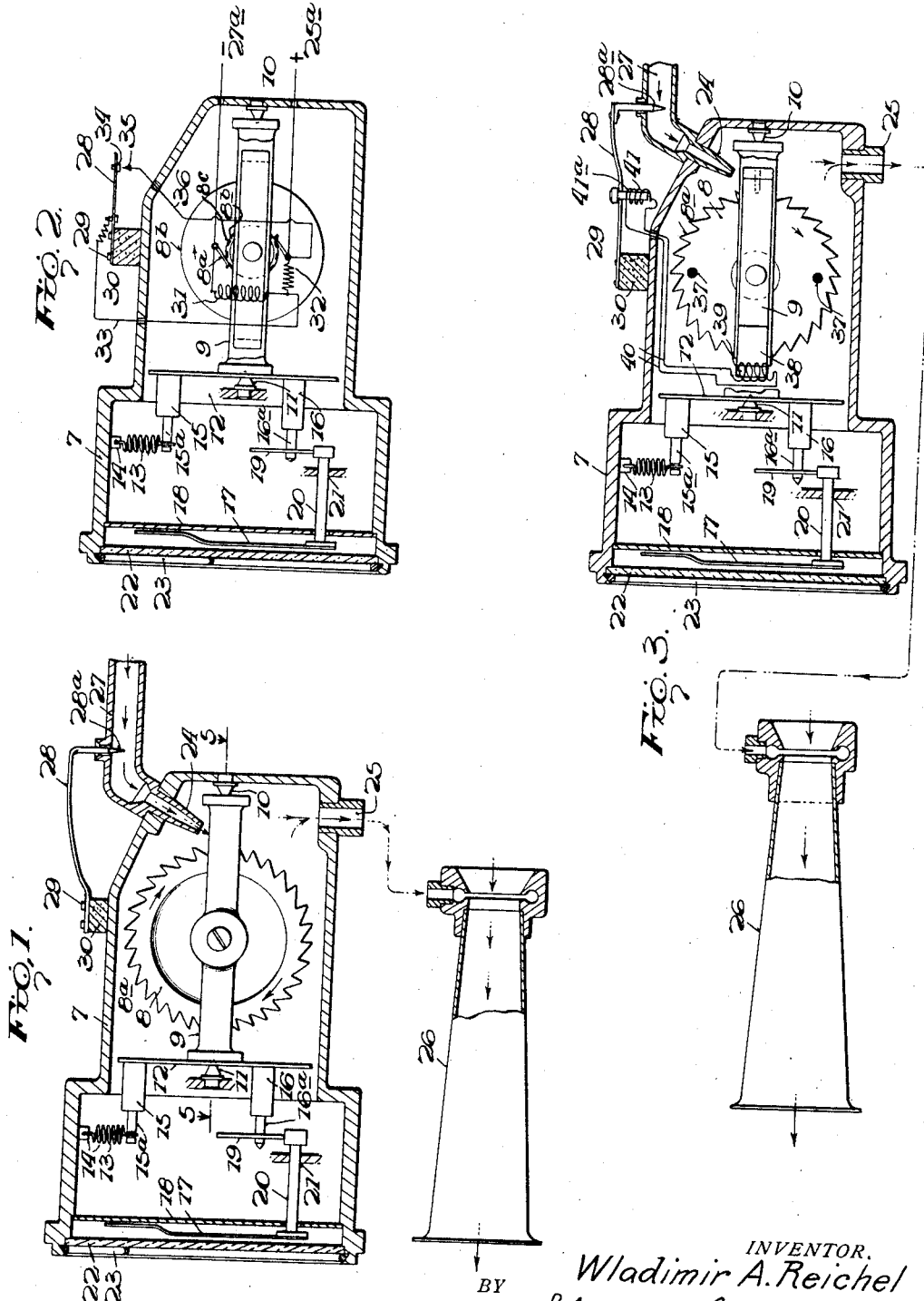
INVENTOR.
Wladimir A. Reichel
BY Stephen Cerstvik
ATTORNEY.

July 22, 1941.  W. A. REICHEL  2,249,914
SPEED CONTROL OF ROTOR GYROSCOPES
Filed Aug. 22, 1939  2 Sheets-Sheet 2
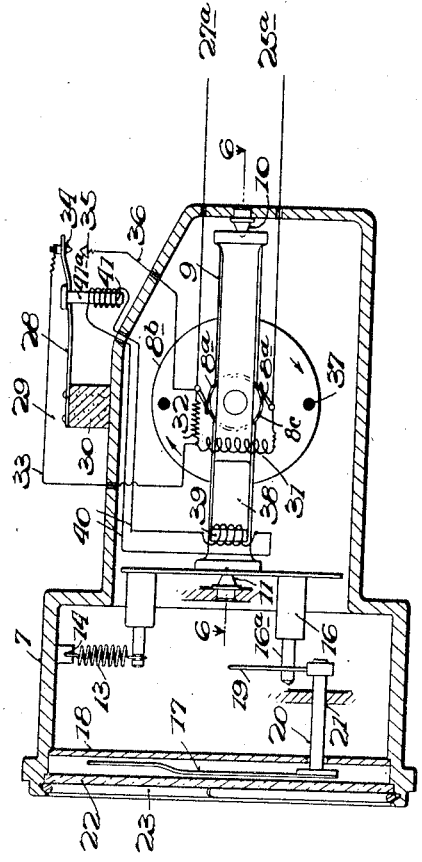
INVENTOR.
Wladimir A. Reichel
BY Stephen Gerstvik
ATTORNEY.

Patented July 22, 1941

2,249,914

UNITED STATES PATENT OFFICE 2,249,914

SPEED CONTROL OF ROTOR GYROSCOPES

Wladimir A. Reichel, Bellerose, N. Y., assignor to Bendix Aviation Corporation, South Bend, Ind., a corporation of Delaware Application August 22, 1939, Serial No. 291,435

2 Claims. (Cl. 171—222)

The present invention relates to gyroscopes and more particularly to gyroscopes adapted for use in aircraft instruments.

At the present time, several gyroscopic instruments are employed, such, for instance, as a gyroscopic rate of turn indicator, directional gyroscope, and a gyro pendulum which provides an artificial horizon. In order that such instruments may be capable of efficient operation it is desirable that the speed of rotation of the gyroscope rotors be maintained constant particularly in rate of turn indicators. Air pressure for driving the gyro rotors is generally supplied either from the aircraft engine by operating a pressure or suction pump, or by using the suction produced by the intake manifold of the engine, or by a Venturi tube projecting from the wing of the aircraft. In all of these instances, however, the air pressure varies with the speed of the engine or of the craft and consequently the speed of rotation of the gyroscope rotors of the instruments varies accordingly. When the gyroscope rotor is driven by electrical energy, changes in the source of supply affect the speed of rotation.

It is, therefore, one of the objects of the present invention to provide a novel method and apparatus for regulating the speed of rotation of the gyroscope rotor whereby the speed may be maintained substantially constant.

Another object of the invention is to provide novel means in a gyroscope whereby vibrations set up by the rotor of the gyroscope are used to control the motivating force which drives the rotor.

Still another object of the invention is to provide, in a gyroscope, a novel speed controlling device comprising means responsive to the speed of the gyroscope rotor for setting up vibrations whereby the speed of the rotor is controlled.

A further object of the invention is to provide, in combination with a gyroscope, novel means for providing electrical impulses proportional to the speed of the gyroscope rotor and means responsive to those impulses whereby the speed of the rotor is controlled.

A still further object of the invention is to provide in combination with a gyroscope, novel means for producing electrical impulses proportional to the speed of the gyroscope rotor, vibrating means responding to those impulses, and an electrical circuit supplying the gyroscope rotor controlled by the vibrating means.

Another object of the invention is to provide an arrangement for a gyroscope whereby the speed of the rotor will be controlled in accordance with the conditions created by the rotor itself during operation of the gyroscope. The arrangement resides in the provision of a vibrating member controlled by variable electrical impulses created by the varying speed of the rotor, and controlling the supply of the impelling current to the rotor by the vibrating member.

The above and other objects and advantages of the invention will appear more fully hereinafter from a consideration of the detailed description which follows, taken together with the accompanying drawings wherein several embodiments of the invention are illustrated. It is to be expressly understood, however, that the drawings are for the purpose of illustration and description only and are not designed as a definition of the limits of the invention, reference being primarily had for this purpose to the appended claims.

The novel device, as herein disclosed, is shown applied to a turn indicator but it is to be expressly understood that the device is not limited to such use.

In the drawings, wherein like reference characters refer to like parts throughout the several views:

Fig. 1 is a side elevation, partly in section, illustrating one embodiment of the invention;

Fig. 2 is a side elevation, partly in section, illustrating another embodiment of the invention;

Fig. 3 is a side elevation, partly in section, illustrating a modification of the device as shown in Fig. 1;

Fig. 4 is a side elevation, partly in section, of the modification of the device as shown in Fig. 2;

Fig. 5 is a plan view, partly in section, taken on the line 5—5 of Fig. 1; and

Fig. 6 is a plan view, partly in section, taken on line 6—6 of Fig. 4.

Broadly, the method of the invention comprises generating vibrations proportional to the speed of rotation of the gyroscope rotor, and utilizing said vibrations to control the speed of rotation of said rotor, while the apparatus comprises, generically, means for producing vibrations proportional to the speed of rotation of the gyroscope rotor, and means controlled by said vibrations for regulating the speed of said gyroscope rotor.

Referring now to the drawings and more particularly to Fig. 1, the invention is shown as applied to a rate of turn gyroscope having a casing 7 containing a rotor 8 having vanes or blades 8a, mounted on a frame 9, pivoted at points 10 and 11 and connected to the casing. Disc or plate 12 is mounted on frame 9 and rotates therewith being constrained against said rotation by spring 13 connected to the casing 7 at one end thereof as indicated at 14 and fastened at the other end thereof to one end of a pin 15a connected to rod 15 mounted on plate 12. Also connected to the plate 12 is a rod 16 carrying a pin 16a which drives pointer 17 moving over scale 18 by means of a fork 19 and rotating rod 20 journalled at 21. The casing is closed off at the front end thereof by means of a glass cover 22 held in place by means such as a resilient split ring 23.

Means are provided for rotating the rotor 8, and in the embodiment of Fig. 1 such means are illustrated as an air drive comprising a nozzle 24, outlet 25, venturi 26 and tubing connecting said outlet to the venturi as indicated by the arrows. Flow of air through the venturi when the latter is mounted on the wing of an aircraft produces a suction at the outlet 25 of casing 7 and air is sucked in at inlet 27 and is directed against the blades 8a by the nozzle 24, thereby driving rotor 8.

In accordance with the invention, means are provided for regulating the amount of air passing through the nozzle 24 to regulate the speed of rotor 8, and for this purpose there is located in intake conduit 27 a gate valve 28a carried by a vibrating element 28 mounted by screws 29 to block 30 which is fastened to or integral with the casing 7. The member 28a and conduit 27 are made of conforming shape and cross-section, respectively, when the most sharply defined speed control is desired, namely, i. e., if the cross-section of conduit 27 is made circular then the member 28a is made circular in shape, and if the cross-section of conduit 27 is rectangular or square then the shape of member 28a is made rectangular or square.

The operation of the device as shown in Fig. 1 is as follows:

Air is sucked in through casing 7 by means of venturi 26 directed to outlet 25. This causes a jet of air to issue from the nozzle 24 which impinges upon the rotor blades 8a of rotor 8, thereby driving the latter. If the craft on which the gyroscopic instrument, here shown as a rate of turn indicator, is turned to the right about the vertical axis of the craft parallel to axis $x$—$x$ shown in Fig. 1, the gyro precesses and rotates the frame 9 and plate 12 about pivots 10 and 11 against the force of spring 13, and thereby moves pointer 17 in proportion to the rate of turn. As the craft turns in one direction the pointer is turned in that direction and when the craft is turned in the opposite direction the pointer is likewise turned in the opposite direction to indicate the direction of the turn.

As the craft on which the instrument and the venturi are mounted changes in speed, the suction produced by the venturi also changes, thereby changing the rate of rotation of the rotor 8. In order to maintain the speed of rotation constant, vibrating element 28 is utilized to control the flow of air to the nozzle 24. Upon rotation of the rotor 8 vibrations are set up in the casing 7 which are transmitted through block 30 to vibrating element 28. Element 28 vibrates within a desired range in proportion to the speed of rotation of the rotor 8 mounted in casing 7. As the rotor increases in speed the vibrator 28 vibrates at a greater rate and amplitude and therefore gate valve 28a projects to a greater extent into the conduit 27 a greater portion of the total time, thereby cutting down the flow of air through nozzle 24, and hence maintaining the rotation of the rotor 8 at the speed desired. When the speed of the rotor 8 decreases, the valve 28a of vibrating element 28 projects to a lesser extent into the conduit 27 a smaller portion of the time and the flow of air to rotor 8 is increased, thereby maintaining the rotation of said rotor constant.

In Fig. 2, the rotor 8b in the form of an armature of an electric motor is driven by the commutator 8c fed from the electric power means 27a, 25a, as shown by brushes 8a. The field 31 is a shunt field and has in series therewith a resistance 32, while the junction of said field and resistance is connected to vibrating element 28 by lead 33. There is provided an element 28 and movable therewith a contact 34 which is adapted to engage a stationary contact 35 connected by lead 36 to the brush end of resistance 32.

When the speed of rotor 8b tends to increase above a certain speed, the casing 7 and the vibrating element 28 vibrate at a greater speed, thereby shunting for a greater portion of the total time the resistance 32 by means of contacts 34 and 35 and the leads connected thereto. This shunting of resistance 32 increases the strength of the shunt field 31 which, being supplied at this increased strength a greater portion of the time, slows down the rotation of rotor 8b to the speed desired. Upon a decrease in speed the reverse effect occurs and the shunt field is lessened in force a greater portion of the time thereby allowing rotor 8b to increase in speed to that desired.

In Fig. 3, rotor 8 carries therein a pair of elements 37 composed of a magnetic material, which passes between the extremities of a horseshoe magnet 38 carried by frame 9 and shown generically in Fig. 6, to change the reluctance of the magnetic path of said magnet periodically without speed of rotation. Reference is made to my co-pending application filed January 28, 1937, Serial No. 122,890, wherein this embodiment is more fully illustrated and claimed. These periodic changes induce electric impulses in coil 39 which is wound on the magnet 38, the impulses being transmitted by leads 40 to a solenoid coil 41. Coil 41 coacts with an armature core 41a to transmit these impulses to vibrating element 28 which, in this embodiment is composed of electrical conducting material and is vibrated electrically in accordance with the frequency of the impulses produced in coil 39 instead of mechanical vibrations, the element being so damped or protected against mechanical vibrations that it will not respond thereto.

When the speed of rotation of rotor 8 increases, the elements 37 pass between the ends of magnet 38 a greater number of times per given period thereby increasing the frequency of the electrical impulses produced in coil 39 and transmitted to coil 41. These in turn vibrate element 28 at a greater rate so that valve 28a of element 28 obstructs the conduit 27 a greater portion of the time thereby throttling the flow to nozzle 24, and hence, reducing the speed of rotation of rotor 8 to the speed desired.

Upon a decrease in speed of rotor 8, the valve 28a of element 28 projects within the conduit 27 a lesser portion of the time the flow to nozzle 24 is increased and the rotor 8 is speeded up to the speed desired.

In Fig. 4, the rotor 8b is again, as in Fig. 2, in the form of an armature of an electric motor and is rotated by means of commutator 8c fed from the mains 27a, 25a, by brushes 8d. The shunt field 31 of the motor has in series therewith resistance 32, while the junction of said field and resistance is connected to vibrating element 28 by lead 33. As in Fig. 2 there is provided a contact 34 on element 28 which cooperates with a fixed contact 35 connected by lead 36 to the rush end of resistance 32.

Mounted on rotor 8b is a pair of elements 37 composed of magnetic material which passes between the ends of horseshoe magnet 38 carried by frame 9 as shown in Fig. 6, to change the reluctance of the magnetic path of said magnet periodically with the period of rotation. These periodic changes induce electric impulses in coil 39 which is wound on magnet 38, the impulses being transmitted by leads 40 to a solenoid 41. Coil 41 coacts with an armature core 41a to transmit these impulses to vibrating element 28 which, in this embodiment, is vibrated electrically in accordance with the frequency of the impulses produced in coil 39 instead of mechanical vibrations, the element being so damped or protected against mechanical vibrations that it will not respond thereto. When the speed of rotation of rotor 8b increases, elements 37 pass between the ends of the horseshoe magnet 38 a greater number of times per given period thereby increasing the frequency of the electrical impulses produced in coil 39 and transmitted to coil 41 by leads 40. These impulses in coil 41 actuate armature for 41a to vibrate element 28 at a greater rate closing contacts 34 and 35 to thereby shunt resistance 32 a greater portion of the total time, whereby the full force of shunt field 31 is applied. This reduces the speed of rotation of rotor 8b to the speed desired.

Upon decrease in the speed of rotor 8b below that desired, the impulses to coil 41 are reduced in number thereby shunting resistance 32 a shorter portion of the time whereby the force of the shunt field on the rotor is reduced a greater portion of the total time and rotor 8b is allowed to increase its speed of rotation to the speed desired.

There have thus been provided novel means whereby the speed of rotation of a rotor of a gyroscope is maintained constant in a simple and novel manner.

Although a plurality of embodiments of the invention have been illustrated and described, further changes and modifications in form, materials, and relative arrangement of parts which will now appear to those skilled in the art may be made without departing from the scope of the invention. Reference is therefore to be had to the appended claims for a definition of the limits of the invention.

What I claim is:

1. In combination with a gyro rotor, magnetic means carried by said rotor, electrical means for driving said rotor, vibrating means controlling said electrical means, and an electrical circuit including a magnetic element for controlling said vibrating means, said magnetic means varying the reluctance of said magnetic element in accordance with the rotor speed.

2. In combination with a gyro rotor, electrical means having current flow therein for driving said rotor, magnetic means mounted for rotation with said rotor, intermittently movable means for controlling the current flow in said electrical means for varying the speed of rotation of said rotor, and an electrical circuit including a magnetic element for controlling said intermittently movable means in accordance with the speed of said rotor, said magnetic means varying the reluctance of said magnetic element whereby current flow in said electrical circuit is varied with said rotor speed.

WLADIMIR A. REICHEL.